US008825045B2

(12) United States Patent
Singh et al.

(10) Patent No.: US 8,825,045 B2
(45) Date of Patent: Sep. 2, 2014

(54) POLICY-BASED ROAMING UPDATES FOR MOBILE DEVICES

(71) Applicant: Smith Micro Software, Inc., Aliso Viejo, CA (US)

(72) Inventors: Bikramjit Singh, Carlsbad, CA (US); Karl Medina, Oceanside, CA (US); Brian Deeley, Irvine, CA (US); Dzung Tran, Purcellville, VA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 0 days.

(21) Appl. No.: 13/646,569

(22) Filed: Oct. 5, 2012

(65) Prior Publication Data
US 2014/0099945 A1  Apr. 10, 2014

(51) Int. Cl.
*H04W 24/00* (2009.01)
(52) U.S. Cl.
USPC ................................ 455/432.1; 455/435.1
(58) Field of Classification Search
CPC .......... H04W 8/02; H04W 8/04; H04W 8/06; H04W 8/18; H04W 36/08; H04W 80/04
USPC .......................... 455/432.1, 432.3, 433, 435.1
See application file for complete search history.

(56) References Cited

U.S. PATENT DOCUMENTS

2005/0227688 A1   10/2005  Li
2013/0232561 A1 *  9/2013  Gupta ............................. 726/5

FOREIGN PATENT DOCUMENTS

WO   WO 2005/069660    7/2005

OTHER PUBLICATIONS

Giesecke & Devrient "Flexible steering of roaming for superior service availability and subscriber experience" Giesecke & Devrient Jan. 2011 4 pages.
Gemalto "Gemalto Roaming Director: Real-time traffic steering to maximize roaming profitability" Gemalto 2010 2 pages.

* cited by examiner

*Primary Examiner* — Sam Bhattacharya
(74) *Attorney, Agent, or Firm* — Farjami & Farjami LLP

(57) ABSTRACT

Presented is a system and method for providing policy-based roaming updates for a mobile device. The method includes receiving one or more roaming policies from a server, monitoring several parameters of the mobile device for a change in one or more of the several parameters, and evaluating the one or more of the several parameters and the change according to the one or more roaming policies. The method further includes updating a roaming priority list on the mobile device in response to the evaluating, and roaming, after the updating, according to the roaming priority list for establishing a wireless communication. The roaming priority list may include a home network and one or more roaming networks.

20 Claims, 4 Drawing Sheets

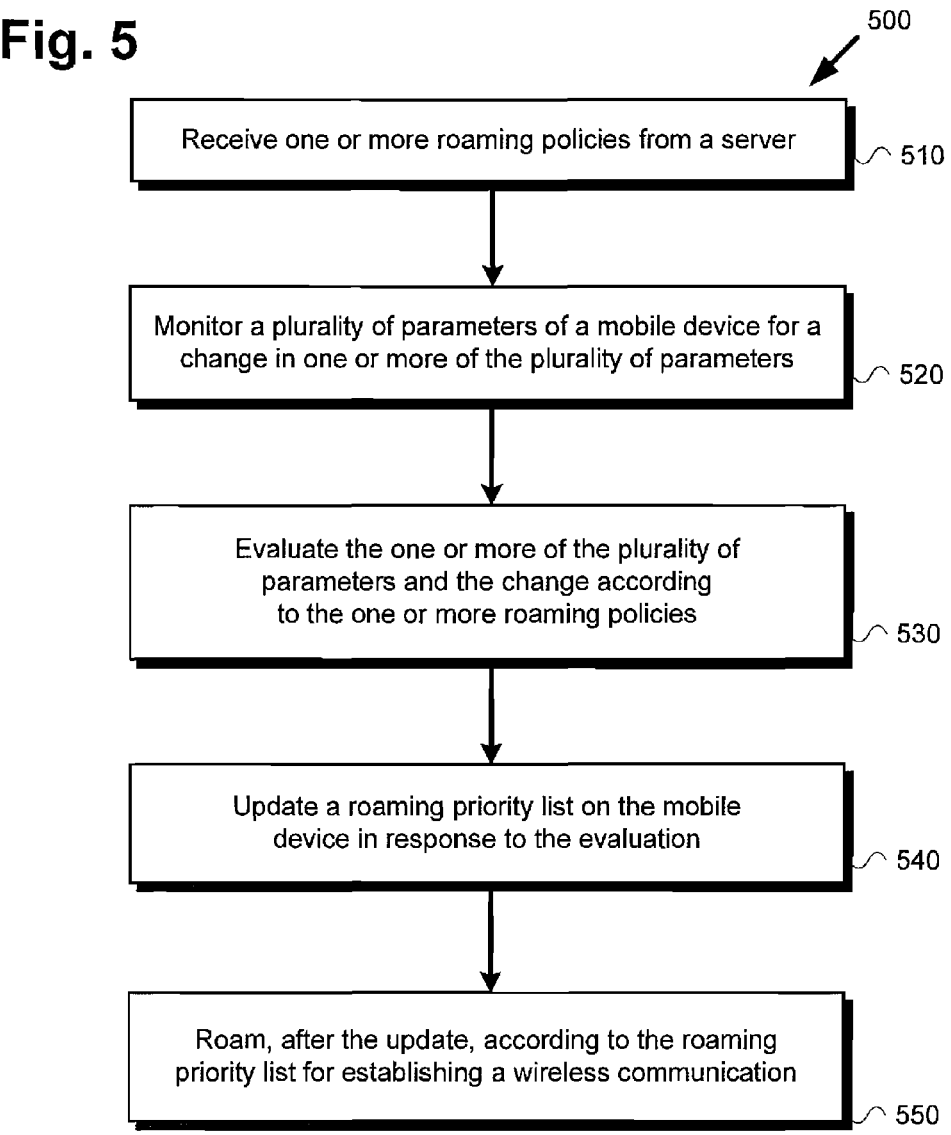

POLICY-BASED ROAMING UPDATES FOR MOBILE DEVICES

BACKGROUND

Conventional mobile devices are capable of connecting to a home network serviced by the carrier of the mobile device as well as one or more roaming networks. However, the determination of priority for connecting to roaming networks is based on a static roaming priority list, typically based on the instant location of the mobile device and any valid roaming agreements with other carriers servicing that location. However, such roaming priority lists are static and cannot be updated in real-time, nor can they be updated in response to conditions or parameters monitored by the mobile device or the carrier network as a whole. Because traffic load on any given network is heavily dependent on the time of day and location within the network, periodic bottlenecking at different locations and times within networks is common. Further promoting bottlenecking, such static roaming priority lists do not allow for transitions from the home network to a roaming network unless the home network is no longer available for connection. Thus, such static global roaming priority lists fail to provide for adequate utilization of available bandwidth of the home network and available roaming networks.

SUMMARY OF THE INVENTION

The present disclosure is directed to policy-based roaming updates for mobile devices, substantially as shown in and/or described in connection with at least one of the figures, and as set forth more completely in the claims.

BRIEF DESCRIPTION OF THE DRAWINGS

FIG. 5 presents an exemplary flowchart illustrating a method for providing policy-based roaming updates for a mobile device, according to one implementation of the present application.

DETAILED DESCRIPTION

Figure 1:
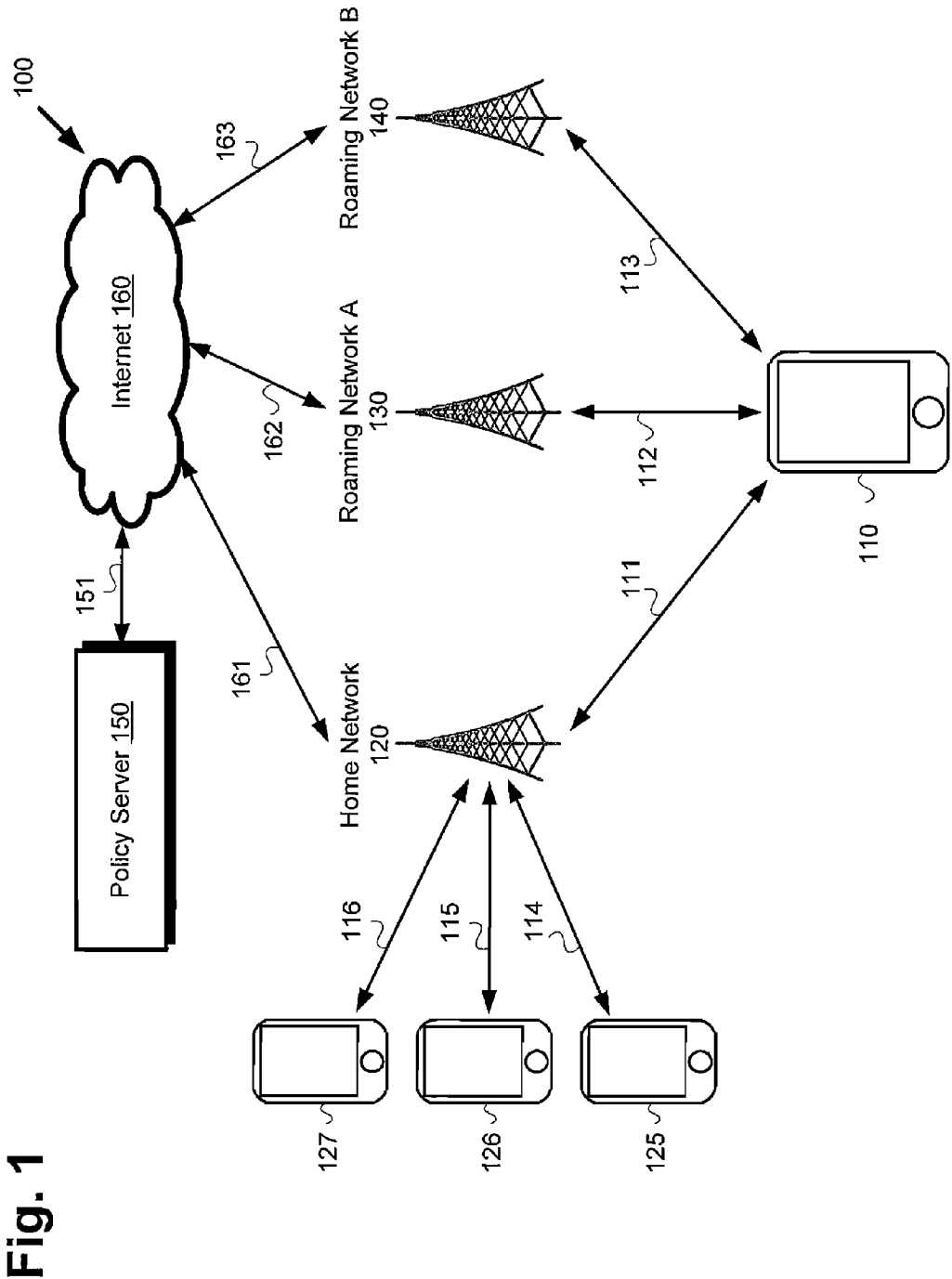
FIG. 1 presents an exemplary system for providing policy-based roaming updates for a mobile device, according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As the volume of data being transferred wirelessly increases, it becomes increasingly important for network carriers to optimize all network resources at their disposal. The utilization of roaming partners, or other carriers who make their network available to a particular carrier is one method by which carriers may offer service in areas where the carrier does not have adequate home network availability or capacity. However, carriers are typically limited to a single static list of preferred roaming partners based on unavailability of the original home network in particular locations. According to conventional operation, this roaming priority list is fixed once loaded onto a mobile device. Updating the list either requires a user of the mobile device to enter a code into the mobile device, or requires the carrier to push a firmware update to the mobile device. In either case, the mobile device must be rebooted for list changes to take effect. Because these roaming priority lists are static, roaming does not occur based on dynamic conditions of the particular mobile device or the network as a whole, but only when the home network is unavailable in a particular location. In this manner, conventional static roaming priority lists move down through the roaming priority list as prioritized roaming networks are sequentially unavailable.

Current real-time traffic steering methods include programming roaming priority lists in mobile devices by Subscriber Identity Module (SIM) card programming utilizing Over-the-Air Parameter Administration and Service Provisioning (OTSPA/OTASP) protocols. However, such methods only update the roaming priority list of a mobile device during first registration of the mobile device upon entry of a new international service area, and are only compatible with GSM-based technologies. Unfortunately, such SIM card reprogramming methods are not based on continuous, real-time conditions of the mobile device.

The present application presents a solution that automatically updates a roaming priority list for a mobile device and selects a particular roaming partner, based on real-time conditions and events of the mobile device and carrier-defined policies, utilizing an intelligent rules engine embedded within the mobile device. After updating the priority of roaming partners in real-time, traffic may be directed to the selected roaming partner network even if the home network is available. Thus, carriers are able to define the priority of roaming partner connections in the policy and manage them based on a pre-defined set of rules.

FIG. 1 presents an exemplary system for providing policy-based roaming updates for a mobile device, according to one implementation of the present application. As shown in FIG. 1, system 100 may include mobile device 110 as well as several other mobile devices 125, 126 and 127. System 100 may further include several wireless networks, such as home network 120, roaming network A 130, and roaming network B 140, over which each of the mobile devices may connect for sending and/or receiving desired content. Each of networks 120, 130 and 140 may be one of a 2G network, a 3G network, a 4G network, an LTE network, a WiFi network, a WiMax network, or any other wireless network without limitation. Additionally, each of home network 120, roaming network A 130, and roaming network B 140 may be maintained by a different carrier. However, the carrier of home network 120 may have one or more valid roaming agreements with the carriers of roaming network A 130 and roaming network B 140.

Mobile device 110 may potentially connect to home network 120 via connection 111, roaming network A 130 via connection 112, and/or roaming network B 140 via connection 113, depending on which connection or connections is/are most desirable for a particular mobile device state and/or network-wide state. Likewise, mobile devices 125-127 may communicate with home network 120 via connections 114-116, respectively.

System 100 may additionally include policy server 150, which may be connected to Internet 160 via connection 151. Internet 160 may be configured to connect to home network 120 via connection 161, roaming network A 130 via connection 162, and roaming network B 140 via connection 163. Policy server 150 may communicate with each mobile device to administrate network-wide, policy-driven control and management of roaming priority lists to provide network access to mobile devices based on one or more carrier-controlled goals. Examples of such carrier-controlled goals may include reducing congestion on the home network, reducing carrier costs by selecting the current lowest cost roaming partner, matching particular application data with the most appropriate available network, and ensuring highest customer QoS regardless of whether connection is through the home network or a roaming network.

Which policy and/or rules are implemented for one or more mobile devices may be determined from real-time parameters such as, but not limited to, a model ID of a mobile device, a time of day, a day of the year, a location of a mobile device, an ID of an application running on a mobile device, a data rate of communication for a mobile device, a cost of communicating over a particular network, a subscription ID, a type of available network, a current traffic load on a particular network, a received signal strength indication (RSSI), a number of mobile devices on a particular network, and a particular quality of service (QoS) standard.

Thus, constantly changing mobile-device-specific data as well as network-wide data may be taken into account in determining appropriate roaming priority lists. For example, by analyzing real-time as well as previously collected network parameters reported by a collection of mobile devices, the network may provide a real-time macro-level coordination of connections to the home network and/or to one or more roaming networks in order to achieve the one or more carrier-determined goals.

Roaming priority policies may be applied to one or more mobile devices based on any number of criteria. Non-limiting examples of such policy grouping criteria may include a mobile device model or make, a particular geographical location, a particular subscriber plan or entitlement, custom created groups of subscribers, or any combination of subscriber information, service type, application type or network type. In this way multiple network connection policies may be developed for different groupings of mobile devices within a particular network, allowing simultaneous achievement of multiple carrier goals. In addition, the goal or goals, for which network connection policies are focused may be modified by the carrier and/or the mobile device user at any time.

Figure 2:
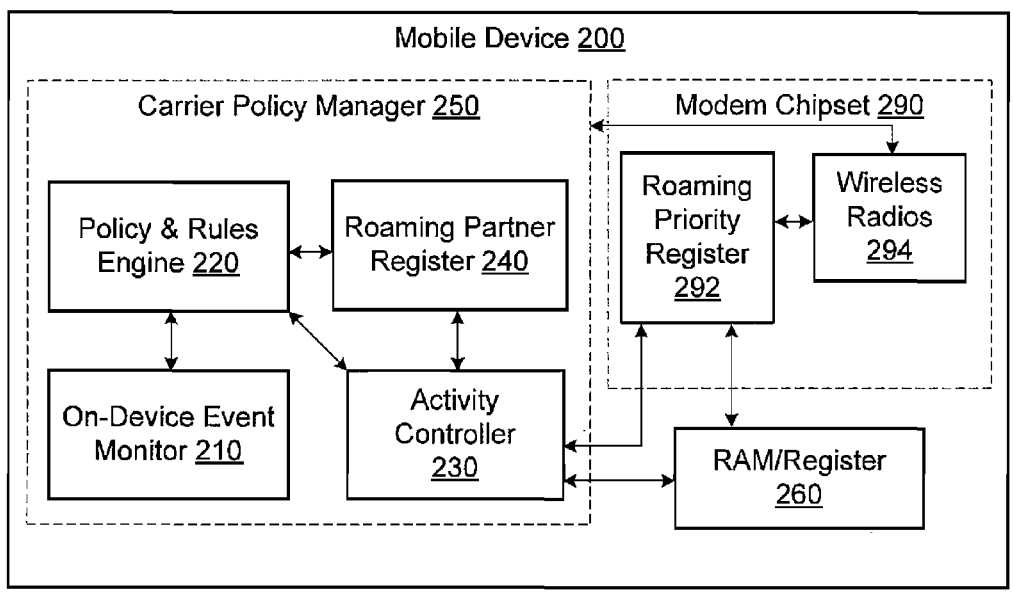
FIG. 2 presents an exemplary mobile device for providing policy-based roaming updates, according to an implementation of the present application.

FIG. 2 presents an exemplary mobile device for providing policy-based roaming updates, according to an implementation of the present application. Mobile device 200 may correspond to mobile device 110 of FIG. 1. Mobile device 200 may include Carrier Policy Manager 250, Modem Chipset 290, and RAM/Register 260. Carrier Policy Manager 250 may include Policy & Rules Engine 220, Roaming Partner Register 240, On-Device Event Monitor 210, and Activity Controller 230. Modem Chipset 290 may further include Wireless Radio 294 and Roaming Priority Register 292.

In operation, mobile device 200 may allow for seamless updating of its roaming priority list in real-time and without requiring a complete system reset. For example, mobile device 200 may receive one or more roaming policies and/or rules, via Wireless Radios 294, from a policy server and may store the roaming policies and/or rules in Roaming Partner Register 240. On-Device Event Monitor 210 may monitor conditions of mobile device 200 and send one or more parameters indicative of the conditions to Policy & Rules Engine 220. Policy & Rules Engine 220 may then evaluate any changes to the parameters in accordance with the carrier policies stored in Roaming Partner Register 240 to determine whether a current roaming priority list, stored within Roaming Priority Register 292, requires updating. If one or more rules and/or policies dictate that updates to the roaming priority list for mobile device 200 are required, Policy & Rules Engine 220 selects the roaming partner and/or roaming partner priority and directs Activity Controller 230 to apply the roaming partner priori into RAM/Register 260. Activity Controller 230 may then notify Modem Chipset 290 that a new roaming priority list is available and Modem Chipset 290 may copy the updated roaming priority list into Roaming Priority Register 292. Modem Chipset 290 may then reset its modem, without requiring an entire system reset, in order to bring the updated roaming priority list into effect in real-time. Modem Chipset 290 then directs Wireless Radios 294 to connect to the appropriate network or networks in accordance with the updated roaming priority list.

Figure 3:
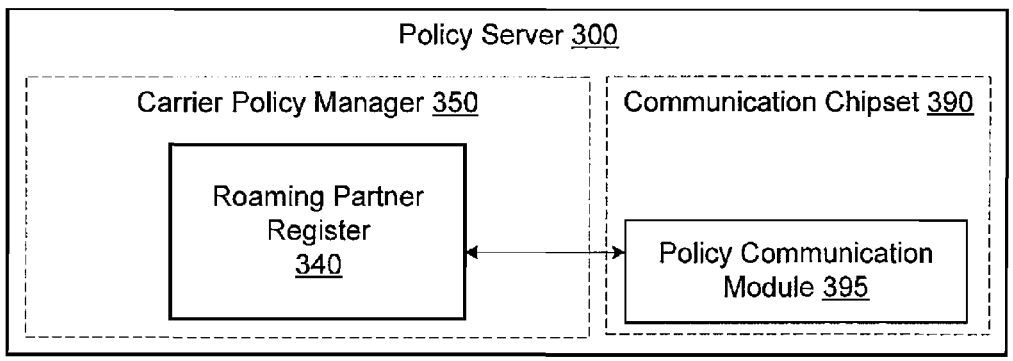
FIG. 3 presents an exemplary policy server for providing policy-based roaming updates to a mobile device, according to an implementation of the present application.

FIG. 3 presents an exemplary policy server for providing policy-based roaming updates to a mobile device, according to one implementation of the present application. Policy Server 300 may include Carrier Policy Manager 350 and Communication Chipset 390. Policy Server 300 may be used to create, store and manage the distribution of roaming policies to one or more mobile devices. Communication Chipset 390 may include Policy Communication Module 395 for communicating with one or more mobile devices, such as mobile device 200. Carrier Policy Manager 350 may include Roaming Partner Register 340, which may store one or more carrier-controlled polices or rules that govern the conditions under which mobile devices serviced by the carrier connect to the carrier's home network and/or one or more roaming networks. Policy Server 300 may receive information regarding one or more conditions of the network from one or more mobile devices and may utilize the information collected from the one or more mobile devices to determine which policies and/or rules for roaming partner priority are appropriate for a particular mobile device, or grouping of mobile devices, based on the received information.

Figure 4A:
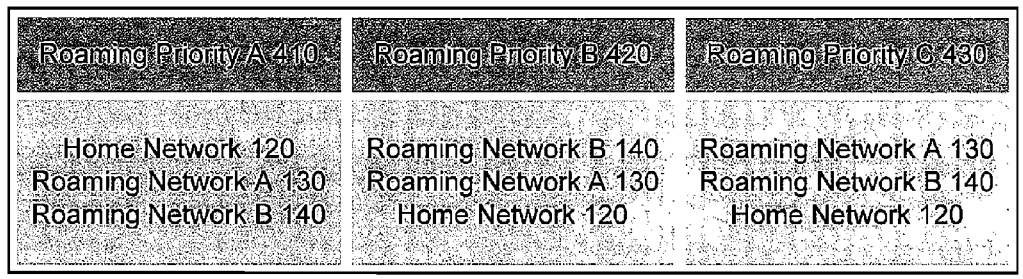
FIG. 4A presents an exemplary chart of several policy-based roaming priority lists, according to one implementation of the present application.

FIG. 4A presents an exemplary chart of several policy-based roaming priority lists, according to one implementation of the present application. For example, chart 400A discloses Roaming Priority A 410, Roaming Priority B 420, and Roaming Priority C 430. In operation, a mobile device utilizing one of the roaming priorities may attempt to connect to the first listed network. If the first network is not available or the mobile device is unable to connect to the first network, the mobile device may attempt to connect to the second listed network. Likewise, if the second network is not available or the mobile device is unable to connect to the second network, the mobile device may attempt to connect to the third listed network. Roaming Priority A 410 may list Home Network 120 first, Roaming Network A 130 second, and Roaming Network B 140 third. Roaming Priority B 420 may list Roaming Network B 140 first, Roaming Network A 130 second, and Home Network 120 third. Finally, Roaming Priority C 430 may list Roaming Network A 130 first, Roaming Network B 140 second, and Home Network 120 third. However, roaming priority lists are not limited to these configurations and may include more or fewer entries and in different orders according to the roaming networks available in a particular location and as determined by Policy Server 300, for example.

Figure 4B:
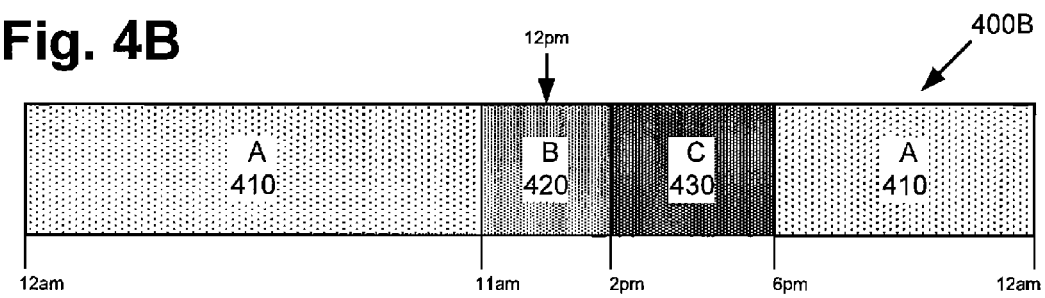
FIG. 4B presents an exemplary diagram illustrating a time-based roaming policy, according to one implementation of the present application.
Figure 4C:
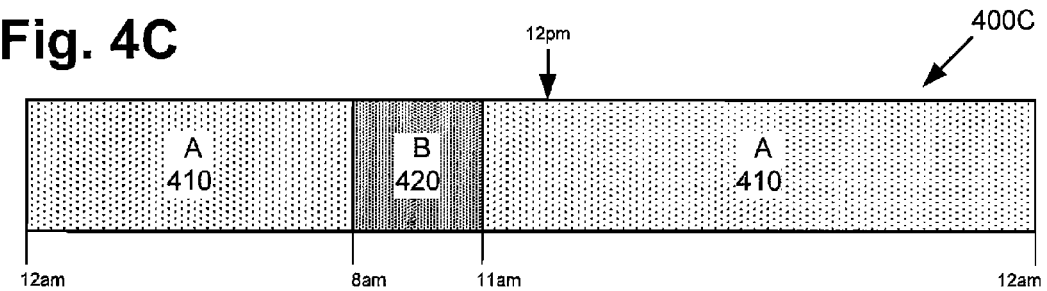
FIG. 4C presents an exemplary diagram illustrating another time-based roaming policy, according to one implementation of the present application.
Figure 4D:
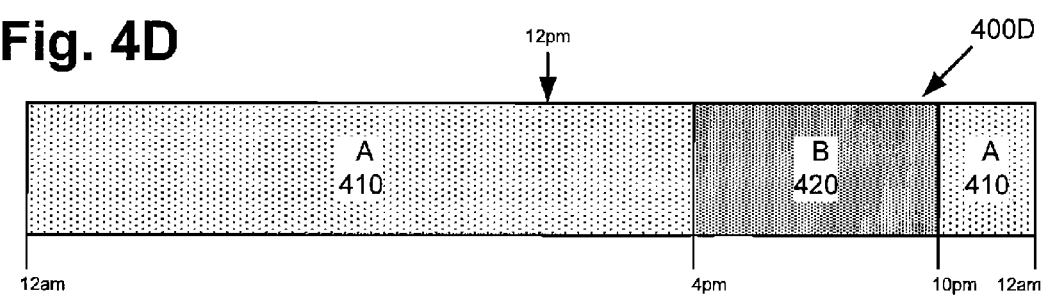
FIG. 4D presents an exemplary diagram illustrating another time-based roaming policy, according to one implementation of the present application.

FIG. 4B presents an exemplary diagram illustrating a time-based roaming policy, according to one implementation of the present application. Diagram 400B may show a 24 hour interval, from 12 am to 12 am for example, during which a first roaming priority list may be applied. For example, a policy or rule may direct a mobile device to apply Roaming Priority A 410 between 12 am and 11 am as well as between 6 pm and 12 am, Roaming Priority B 420 between 11 am and 2 pm, and Roaming Priority C between 2 pm and 6 pm. Diagram 400B may represent the application of a particular rule or policy based on time of day in a first location within the carrier network, or alternatively, based on a particular day of the year. Such a rule or policy may be based on network resource availability or the costs of roaming during a particular time of the day or at a particular location within a network FIG. 4C presents an exemplary diagram illustrating another time-based roaming policy, according to one implementation of the present application. For example, a policy or rule may direct a mobile device to apply Roaming Priority A 410 between 12 am and 8 am as well as between 11 am and 12 am, and Roaming Priority B 420 between 5 am and 11 am. In this example, Roaming Priority C may not be utilized. Diagram 400C may represent the application of a particular rule or policy based on time of day in a second location within the carrier network, or alternatively, based on a particular day of the year. Such a rule or policy may be based on network resource availability or the costs of roaming during a particular time of the day or at a particular location within a network FIG. 4D presents an exemplary diagram illustrating another time-based roaming policy, according to one implementation of the present application. For example, a policy or rule may direct a mobile device to apply Roaming Priority A 410 between 12 am and 4 pm and between 10 pm and 12 am, and Roaming Priority B 420 between 4 pm and 10 pm. In this example, Roaming Priority C may not be utilized. Diagram 400D may represent the application of a particular rule or policy based on time of day in a third location within the carrier network, or alternatively, based on a particular day of the year. Such a rule or policy may be based on network resource availability or the costs of roaming during a particular time of the day or at a particular location within a network.

FIG. 5 presents an exemplary flowchart illustrating a method for providing policy-based roaming updates for a mobile device, according to one implementation of the present application. Action 510 of flowchart 500 includes receiving one or more roaming policies from a server. For example, mobile device 200 may receive one or more roaming policies from policy server 300. The one or more roaming policies may include roaming policies such as those shown in one or more of FIGS. 4B-4D, for example, and may be pushed to mobile device 200 over-the-air (OTA).

Action 520 of flowchart 500 includes monitoring a plurality of parameters of a mobile device for a change in one or more of the plurality of parameters. For example, parameters of mobile device 200 may be monitored by On-Device Event Monitor 210. Such parameters may include, without limitation, a model ID of a mobile device, a time of day, a day of the year, a location of a mobile device, an ID of an application running on a mobile device, a data rate of communication for a mobile device, a cost of communicating over a particular network, a subscription ID, a type of available network, a current traffic load on a particular network, a received signal strength indication (RSSI), a number of mobile devices on a particular network, and/or a particular quality of service (QoS) standard.

Action 530 of flowchart 500 includes evaluating the one or more of the plurality of parameters and the change according to the one or more roaming policies. For example, the parameters monitored by On-Device Event Monitor 210 may be evaluated by Policy & Rules Engine 220 in light of the one or more policies received from Policy Server 300. An example of such a change may be mobile device 200 moving from one location where policy 400C is the most appropriate policy to another location where policy 400B is the most appropriate policy.

Action 540 of flowchart 500 includes updating a roaming priority list on the mobile device in response to the evaluation. For example, a roaming priority list stored in Roaming Priority Register 292 may be updated as directed by Activity Controller 230. Updating the roaming priority list may include saving an update list containing a home network and one or more roaming networks to RAM/Register 260, copying the list into a roaming priority list stored in Roaming Priority Register 292, and resetting the modem within Modem Chipset 290 without resetting mobile device 200.

Action 550 of flowchart 500 includes roaming, after the update, according to the roaming priority list for establishing a wireless communication. For example, if the local time for mobile device 200 is 12 pm (noon) and the policy was updated from policy 400C to policy 400B, upon real-time update mobile device 200 would transition from home network 120, as the first entry of Roaming Priority A 410, to Roaming Network B 140 as the first entry of Roaming Priority B.

However, mobile device 200 need not be limited to communicating over a single network at any point in time. For example, mobile device 200 may route a first portion of a wireless communication over one of the home network and one or more roaming networks on the current roaming priority list, and routing a second portion of the wireless communication over a different one of the home network and the one or more roaming networks. In this way, network resources may be further optimized by directing traffic to different networks simultaneously based on the type of traffic. For example, if an Application X generally sends and receives large amounts of data, the carrier may prefer to direct traffic to and from Application X using the home network. In addition, Application Y may require very little bandwidth and so the carrier may want to direct traffic to and from Application Y using a roaming network to spread out the total bandwidth requirements of mobile device 200. In addition, an application that communicates a small amount of data during a first timeframe and an escalating amount of data during a second timeframe may be transitioned from a first network to a second network as the amount of data communicated exceeds a predetermined threshold. For example, as the amount of data communicated increases, communications may be shifted from a roaming network back to the home network to reduce the cost of service to the carrier. In this manner, applications that are "data hogs" may be identified and network distribution policies updated accordingly.

Where a new or unknown application is running on the mobile device, communications for the unknown application may be directed to the home network to conserve costs until a data communication profile can be established for that application. Such an update would essentially amount to placing the home network in the first entry of the updated roaming priority list, as shown by roaming priority A 410 of FIG. 4A. The same separation of services may be applied between any types of data, for example, voice, SMS or any other types of data communications for the mobile device.

Thus, the present application presents a solution that automatically updates a roaming priority list for a mobile device and selects a particular roaming partner, based on real-time conditions and events of the mobile device and carrier-defined policies, utilizing an intelligent rules engine embedded within the mobile device even if the home network is available. Thus, carriers are able to manage roaming partner connections utilizing policies based on a pre-defined set of rules.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use in a mobile device having a processor, said method comprising:
   receiving, by the processor of the mobile device, one or more roaming policies from a server;
   monitoring, by the processor of the mobile device and after receiving the one or more roaming policies from the server, a plurality of parameters of said mobile device for a change in one or more of said plurality of parameters;
   evaluating, by the processor of the mobile device, said one or more of said plurality of parameters and said change according to said one or more roaming policies;
   updating, by the processor of the mobile device and without accessing the server, a roaming priority list on said mobile device in response to said evaluating;
   roaming, after said updating, according to said roaming priority list for establishing a wireless communication.

2. The method of claim 1, wherein said roaming priority list comprises a home network and one or more roaming networks.

3. The method of claim 2, wherein each of said home network and said one or more roaming networks comprise one of a 2G network, a 3G network, a 4G network, an LTE network, a WiFi network, and a WiMax network.

4. The method of claim 1, wherein said evaluating is performed by a policy and rules engine within said mobile device.

5. The method of claim 1, wherein said updating said roaming priority list comprises:
   saving an update list containing a home network and one or more roaming networks to a memory of said mobile device;
   copying said list into said roaming priority list within a modem chipset of said mobile device;
   resetting a modem within said modem chipset without resetting said mobile device.

6. The method of claim 1, wherein said roaming comprises:
   routing a first portion of said wireless communication over one of a home network and one or more roaming networks on said roaming priority list;
   routing a second portion of said wireless communication over a different one of said home network and said one or more roaming networks.

7. The method of claim 6, wherein each of said first portion of said wireless communication and said second portion of said wireless communication comprise different selections of one or more of voice data, short message service (SMS) data, and data for one or more applications running on said mobile device.

8. The method of claim 1, wherein said updating said roaming priority list comprises placing a home network in a first entry of said roaming priority list if said monitoring results in detection of an unknown application running on said mobile device.

9. The method of claim 1, wherein said plurality of parameters comprises real-time values of one or more of a model ID of said mobile device, a time of day, a day of the year, a location of said mobile device, an ID of an application running on said mobile device, a data rate of communication for said mobile device, a cost of communicating over a particular network, a subscription ID, and a type of available networks.

10. The method of claim 1, wherein said one or more roaming policies are carrier-controlled.

11. A mobile device configured for wireless communication, said mobile device comprising:
   one or more circuits configured to:
      receive one or more roaming policies from a server;
      monitor, after receiving the one or more roaming policies from the server, a plurality of parameters of said mobile device for a change in one or more of said plurality of parameters;
      evaluate said one or more of said plurality of parameters and said change according to said one or more roaming policies;
      update, without accessing the server, a roaming priority list on said mobile device in response to said evaluating;
      roam, after said update, according to said roaming priority list for establishing a wireless communication.

12. The mobile device of claim 11, wherein said roaming priority list comprises a home network and one or more roaming networks.

13. The mobile device of claim 12, wherein each of said home network and said one or more roaming networks comprise one of a 2G network, a 3G network, a 4G network, an LTE network, a WiFi network, and a WiMax network.

14. The mobile device of claim 11, wherein said one or more circuits comprise a policy and rules engine to evaluate said one or more of said plurality of parameters and said change according to said one or more roaming policies.

15. The mobile device of claim 11, wherein said one or more circuits are configured to perform, during said update of said roaming priority list:
   saving an update list containing a home network and one or more roaming networks to a memory of said mobile device;
   copying said list into said roaming priority list within a modem chipset of said mobile device;
   resetting a modem within said modem chipset without resetting said mobile device.

16. The mobile device of claim 11, wherein said one or more circuits are configured to automatically perform, during said roam:
routing a first portion of said wireless communication over one of a home network and one or more roaming networks on said roaming priority list;
routing a second portion of said wireless communication over a different one of said home network and said one or more roaming networks.

17. The mobile device of claim 16, wherein each of said first portion of said wireless communication and said second portion of said wireless communication comprise different selections of one or more of voice data, short message service (SMS) data, and data for one or more applications running on said mobile device.

18. The mobile device of claim 11, wherein said one or more circuits are configured to place a home network in a first entry of said roaming priority list, during said update of said roaming priority list, if said one or more circuits detect an unknown application running on said mobile device.

19. The mobile device of claim 11, wherein said plurality of parameters comprises real-time values of one or more of a model ID of said mobile device, a time of day, a day of the year, a location of said Mobile device, an ID of an application running on said mobile device, a data rate of communication for said mobile device, a cost of communicating over a particular network, a subscription ID, and a type of available networks.

20. The mobile device of claim 11, wherein said one or more roaming policies are carrier-controlled.

* * * * *